UNITED STATES PATENT OFFICE.

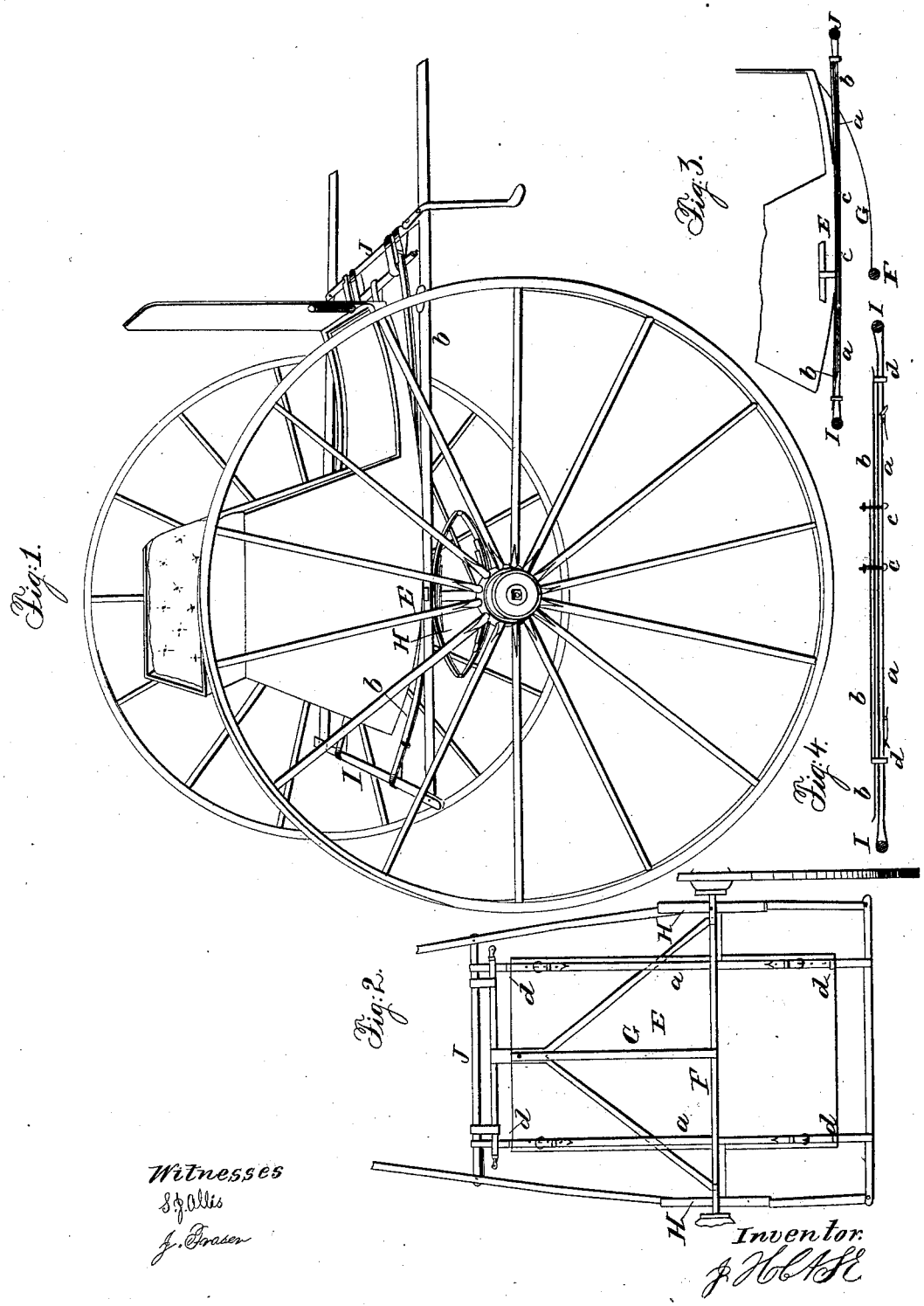

JAMES H. CASE, OF LYONS, NEW YORK.

HANGING BODIES OF VEHICLES.

Specification of Letters Patent No. 24,719, dated July 12, 1859.

*To all whom it may concern:*

Be it known that I, JAMES H. CASE, of Lyons, in the county of Wayne and State of New York, have invented a new and Improved Mode of Constructing Thorough-Braces for Sulkies and other Carriages; and I do hereby declare that the following is a full and exact description thereof, reference being had to the accompanying drawings, making part of this specification, Figure 1 being a perspective view of a vehicle showing my improvement; Fig. 2, a plan view of the same inverted; Fig. 3, a side elevation of the springs and a portion of the box detached; Fig. 4, a detached view of one of the springs.

Like letters refer to corresponding parts in all of the figures.

The nature of my invention consists in combining metallic leaf springs with thorough-braces in such a manner as to combine the effect of flexible and tensile elasticity, and in the method of applying the same to sulkies, gigs and other light carriages.

I take thorough braces of the usual form *a* Fig. 4, and place upon the upper side thereof one or more leaves of spring steel, *b b* connecting them together in or near the center by a bolt or bolts *c c* and with bands *d* at or near the ends. I make the under side of the body of the sulky circular, so as to present a convex surface to the springs which are straight, and attach it to them by bolts, using for convenience the same which are used to connect the parts of the springs together. The effect obtained is a greater elasticity and a more pleasant motion as the improved spring retains the ease without the jerking tremulousness of the thorough-braces and imparts all the firm and agreeable qualities of metallic springs. The convex or circular form of the body where it is attached is essential to the free vibrations of the springs, and admits of setting it in such a manner as to balance with the burthen it is designed to carry by attaching it forward or back of the center. In order to steady the front part and prevent its springing up too much, I attach a thin plate or spring G, to the axle F, and also to the front part of the body as shown in Figs. 2 and 3. This has a very good effect on the riding of the body. The thills being set on elliptic springs H, should extend back of the axle far enough to receive the transverse bar I, to which the thorough-braces are attached, and to the bar J, forward, dispensing with all the additional parts usually employed to make them effective and making the vehicle peculiarly light and elegant.

The advantages derived from employing the metallic or flexible springs with the fibrous and tensional ones consist not only in the greater ease of effect, but in the great security against the breaking of the metal, the straps receiving and relieving it of a great part of the strain. The durability of the leather is also promoted in various ways, one of which is the protection from the weather afforded by the metal overlying it.

The combined spring is also applicable to four-wheeled vehicles, children's carriages, cabs, &c., fully supplying the place of elliptic springs.

I disclaim the combination of springs with thorough braces, except when laid upon the surface thereof, as described, to prevent the excessive catenary sagging, and the unsteadiness of support, which characterizes the flexible material of ordinary thorough braces.

What I claim as my invention and desire to secure by Letters Patent is—

1. The combination of the metallic springs with thorough-braces substantially in the manner and for the purpose herein set forth.

2. I also claim the combination and arrangement of the combined thorough-braces *a b*, with the circular body E, and supplementary spring G, substantially as, and for the purpose herein described.

J. H. CASE.

Witnesses:
S. J. ALLIS,
A. L. TREMPER.